US006892324B1

(12) United States Patent
French et al.

(10) Patent No.: US 6,892,324 B1
(45) Date of Patent: May 10, 2005

(54) MULTI-CHANNEL, MULTI-SERVICE DEBUG

(75) Inventors: Robert S. French, Sunnyvale, CA (US); Gareld H. Banta, Menlo Park, CA (US); Glen Weaver, Sunnyvale, CA (US); Joyjit Nath, Foster City, CA (US); Viresh Rustagi, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 562 days.

(21) Appl. No.: 09/618,965

(22) Filed: Jul. 19, 2000

(51) Int. Cl.[7] .............................................. G06F 11/00
(52) U.S. Cl. ........................................ 714/38; 717/124
(58) Field of Search ............................. 714/38, 37, 25; 717/124–128; 709/104, 226, 229; 718/104

(56) References Cited

U.S. PATENT DOCUMENTS

| 5,630,049 A | * | 5/1997 | Cardoza et al. ................ 714/25 |
| 5,815,653 A | * | 9/1998 | You et al. ...................... 714/38 |
| 6,029,000 A | * | 2/2000 | Woolsey et al. ............. 717/147 |
| 6,112,298 A | * | 8/2000 | Deao et al. .................. 712/227 |
| 6,158,045 A | * | 12/2000 | You ............................ 717/124 |
| 6,324,584 B1 | * | 11/2001 | Mandalia .................... 709/238 |

* cited by examiner

*Primary Examiner*—Dieu-Minh Le
(74) *Attorney, Agent, or Firm*—Christie, Parker & Hale, LLP

(57) ABSTRACT

A method and apparatus for debugging are described. In one embodiment, a target construct is selected for debugging. Data related to an operation of the target construct is accessed by a debug construct in real time. At least a portion of this data is retrieved without disturbing the operation of the target construct to debug the target construct.

82 Claims, 10 Drawing Sheets

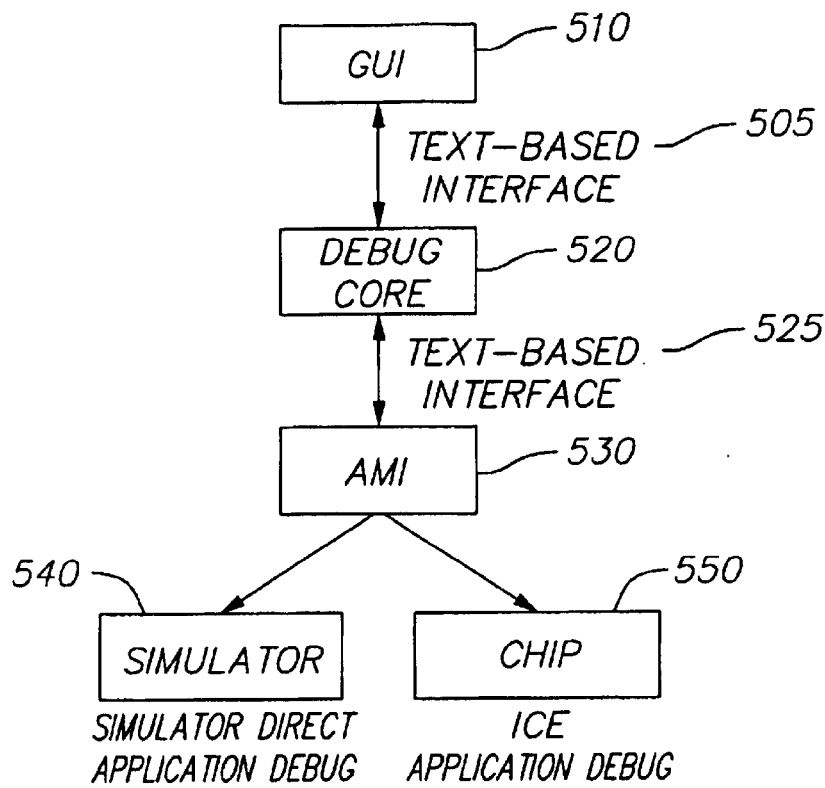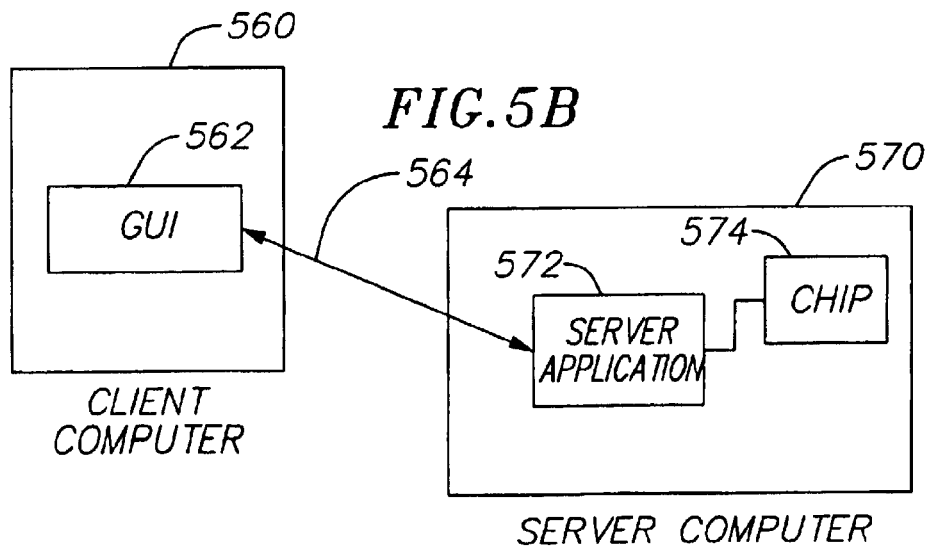

FIG. 9

MULTI-CHANNEL, MULTI-SERVICE DEBUG

RELATED APPLICATION

This present application is related to U.S. patent application Ser. No. 09/564,592, which was filed on May 3, 2000 entitled "System And Method For Multi-Channel Transfer Of Data. This application is also related to U.S. patent application Ser. No. 09/565,580, filed May 4, 2000 entitled "Multi-Channel, Multi-Service Development Architecture".

FIELD OF THE INVENTION

The present invention relates to interactive debugging and more specifically to interactive debugging in a multi-channel, multi-service environment.

BACKGROUND OF THE INVENTION

Traditionally, Digital Signal Processors (DSPs) have been used to run single channels, such as, for example, a single DS0 or time division multiplexed (TDM) slot, that handle single services, such as modem, vocoder, or packet processing. Multiple services or multiple channels require multiple DSPs, each running its own small executive program (small kernel) and application. The executive programs reserve some area in memory for application code. When applications need to be switched, these executive programs overlay this memory with the new application.

Channels may take one of the following forms: one channel carried on a physical wire or wireless medium between systems (also referred to as a circuit); time division multiplexed (TDM) channels in which signals from several sources such as telephones and computers are merged into a single stream of data and separated by a time interval; and frequency division multiplexed (FDM) channels in which signals from many sources are transmitted over a single cable by modulating each signal on a carrier at different frequencies.

Recent advances in processing capacity now allow a single chip to run multiple channels. With this increase in capacity has come a desire to run different services simultaneously and to switch between services.

A current method to implement multiple services or multiple channels involves writing custom versions of all control, overlay, and task-switching code. This requirement causes additional engineering overhead for development and debugging of the applications. In addition, not all services may fit into the memory available to the DSP, and the services must be swapped in from the host system. This swapping—overlaying—adds significant complexity to the implementation of the DSP services. The extra development activity consumes DSP application development time.

The fact that DSPs have a single thread of control creates problems to developing and debugging in the multi-channel, multi-service environment. Debugging an application on a single processor stops all other applications and channels running on that processor. If the processor is running, real-time diagnostics on a channel or service cannot be obtained without interfering with the operation of the other channels and services. In addition, a debugging system typically needs to have direct access to the chip being diagnosed. That is, a conventional debugging system must use a special development board or a physical debug interface (such as a Joint Test Access Group (JTAG) interface) to provide debugging access. This makes debugging in a production environment an inflexible and cumbersome process.

Therefore, what is required is an efficient way of debugging a target application in a multi-channel, multi-service environment, which will allow the developer to obtain real-time diagnostics without interfering with the operation of the target application and other running applications and which will perform debugging services remotely.

SUMMARY OF THE INVENTION

A method and apparatus for debugging are described. In one embodiment, a target construct is selected for debugging. Data related to an operation of the target construct is accessed by a debug construct in real time. At least a portion of this data is retrieved without disturbing the operation of the target construct to debug the target construct.

BRIEF DESCRIPTION OF THE DRAWINGS

The present invention is illustrated by way of example, and not by way of limitation in the figures of the accompanying drawings in which like reference numerals refer to similar elements.

FIG. 5a is a block diagram of one embodiment for an interactive debugging system;

FIGS. 5b and 5c are block diagrams of two alternate embodiments for an interactive debugging system operating over a network;

FIG. 9 illustrates an exemplary implementation of one embodiment for a multi-channel, multi-service debugging system.

DETAILED DESCRIPTION

Figure 1:
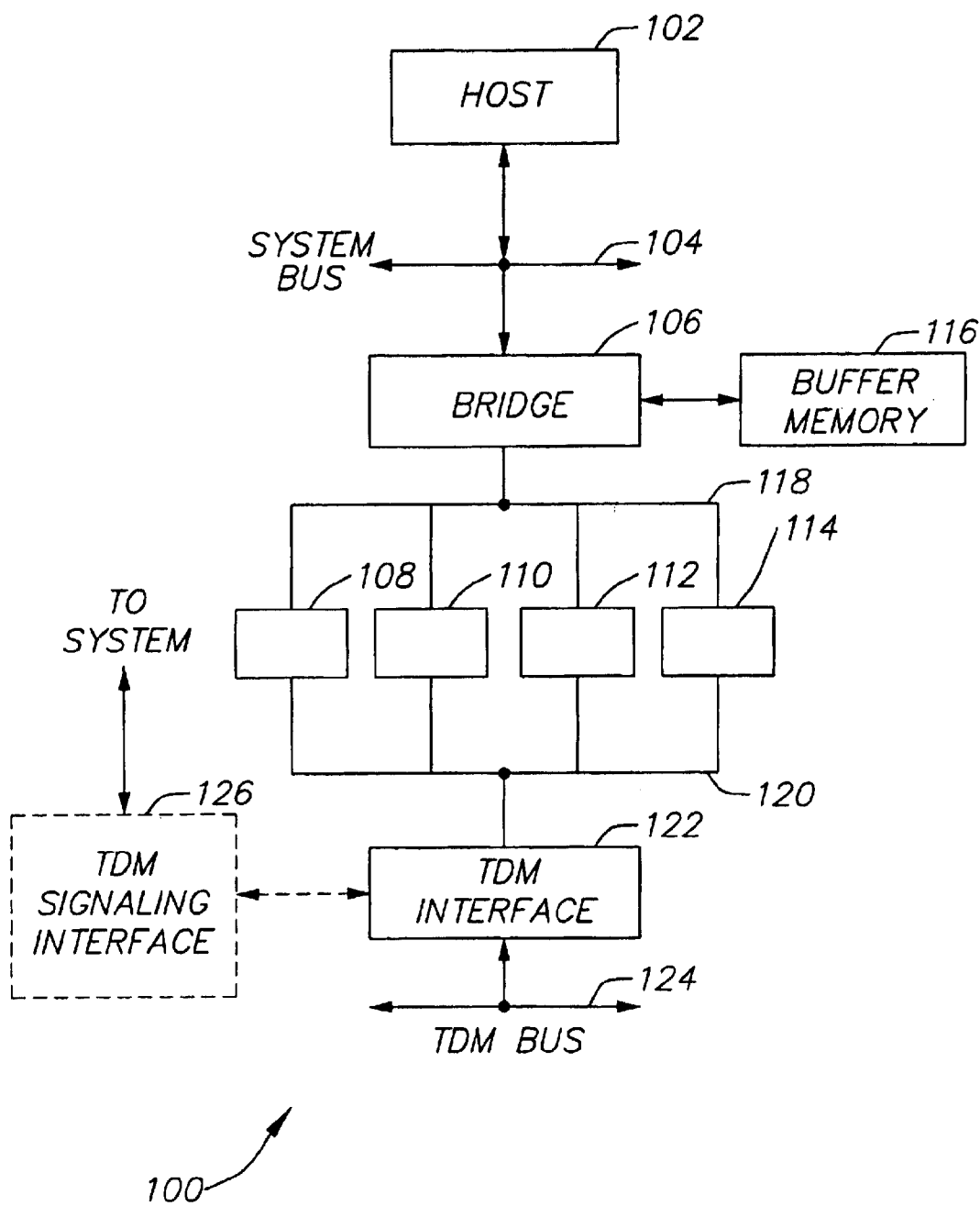
FIG. 1 is a system architecture of one embodiment for a multi-channel, multi-service system.

A method and system for interactive debugging are described. In one embodiment, a target construct is selected for debugging. Data related to an operation of the target construct is accessed by a debug construct in real time. At least a portion of this data is then retrieved without disturbing the operation of the target construct to debug the target construct.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a system architecture of one embodiment for a multi-channel, multi-service system 100. Referring to FIG. 1, host 102 is connected via system bus 104 and bridge 106 to one or more processing chips 108, 110, 112, 114. In addition, bridge 106 is connected to buffer memory 116. Bridge 106 is connected via bus 118 to the processing chips 108–114. Processing chips 108–114 are connected via bus 120 to time division multiplexing (TDM) interface 122. TDM interface 122 is connected to a number of modules and ports installed on the TDM bus 124. In addition, TDM interface 122 is connected to TDM signaling interface 126.

TDM is a base-band technology in which individual channels of data or voice are interleaved into a single stream of bits (or framed bits) on a communications channel. Each input channel receives an interleave time segment in order that all channels equally share the medium that is used for transmission. If a channel has nothing to send, the slot is still dedicated to the channel and remains empty.

In one embodiment, an operating system running within multi-channel, multi-service system 100 supports telecommunication and data communication applications. These applications involve running multiple channels of protocol stacks built from multiple services. Multi-channel, multi-service system 100 enables the dynamic configuration of services within the embedded telecommunication and data communication environment. In addition, the operating system automatically defines the allocation of resources for the channels within system 100.

Figure 2:
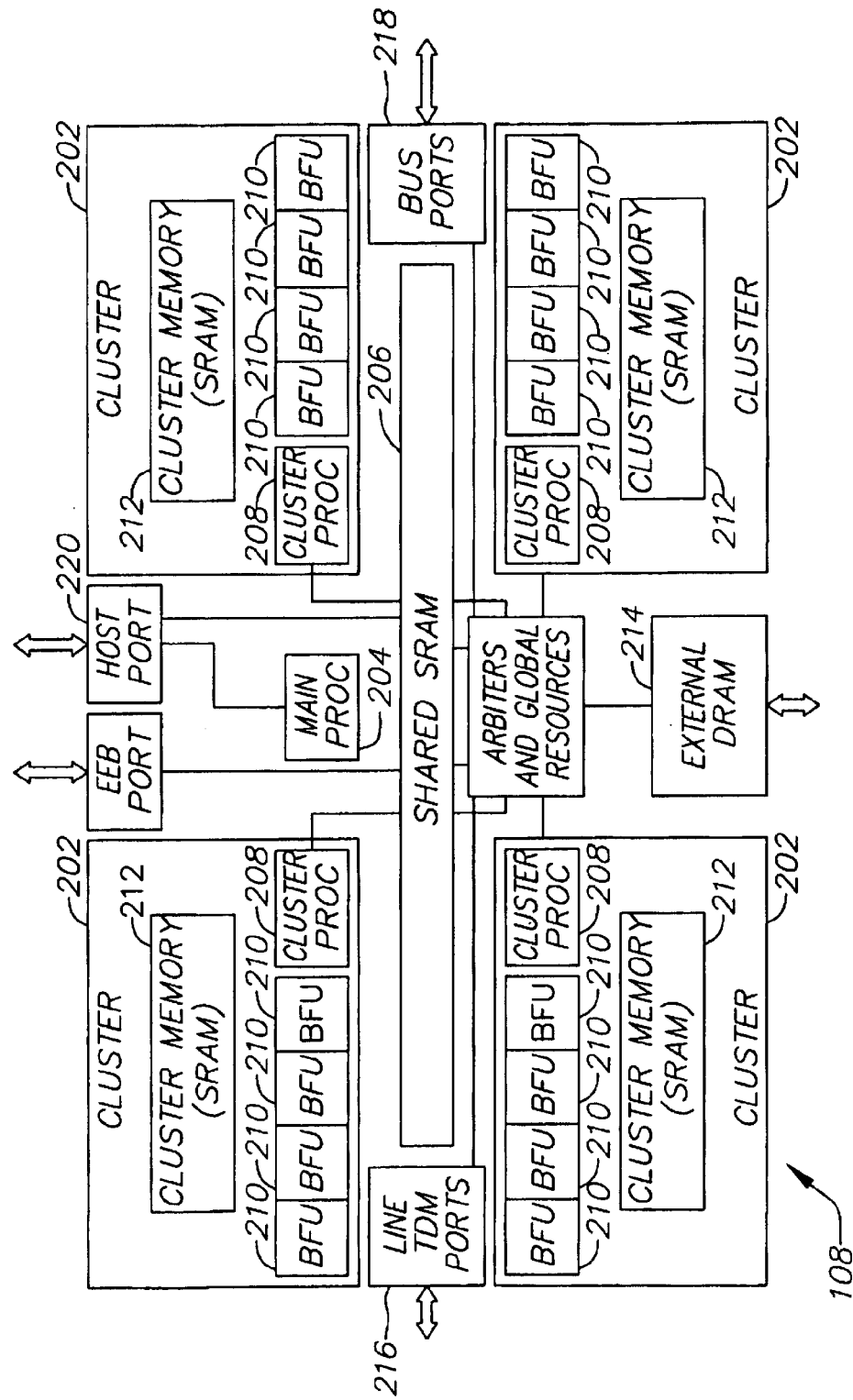
FIG. 2 is a block diagram of one embodiment for a processing chip of FIG. 1.

FIG. 2 is a block diagram of one embodiment for a processing chip 108. Each processing chip 108 contains clusters 202 and main processor 204. Each cluster 202 contains a cluster processor 208 and a number of basic functional units (BFUs) 210. Main processor 204 is configured to perform all control code and operations including receiving control messages from host 102 and allocating channels to the various clusters 202.

Processing chip 108 also includes a shared static random access memory (shared SRAM) 206. Shared SRAM 206 may be accessed directly by all the cluster processors 202 and main processor 204. An instruction store contained within the BFUs 210 can also access shared SRAM 206. Shared SRAM 206 is used for storing operating system and application code as well as hosting the data for code running on main processor 204.

Each cluster 202 contains cluster SRAM 212. Cluster SRAM 212 is responsible for maintaining channel data running on each individual cluster 202. Cluster SRAM 212 includes I/O buffers and program stacks. The operating system of system 100 uses the hardware to enforce memory protection to prevent a channel from inadvertently corrupting another channel's data or code.

External dynamic random access memory (DRAM) 214 may be used for application data too large to fit on the on-chip cluster SRAM 212 or shared SRAM 206 and may be used as a swap area for application code.

Each processing chip 108 includes two line side ports 216 and two bus ports 218. These ports are used for packet side data and control transport. In addition, host port 220 is used to communicate with the host 102 and is accessible only from main processor 204 and serial boot port 222 that is used to send the boot stream to the chip.

Figure 3:
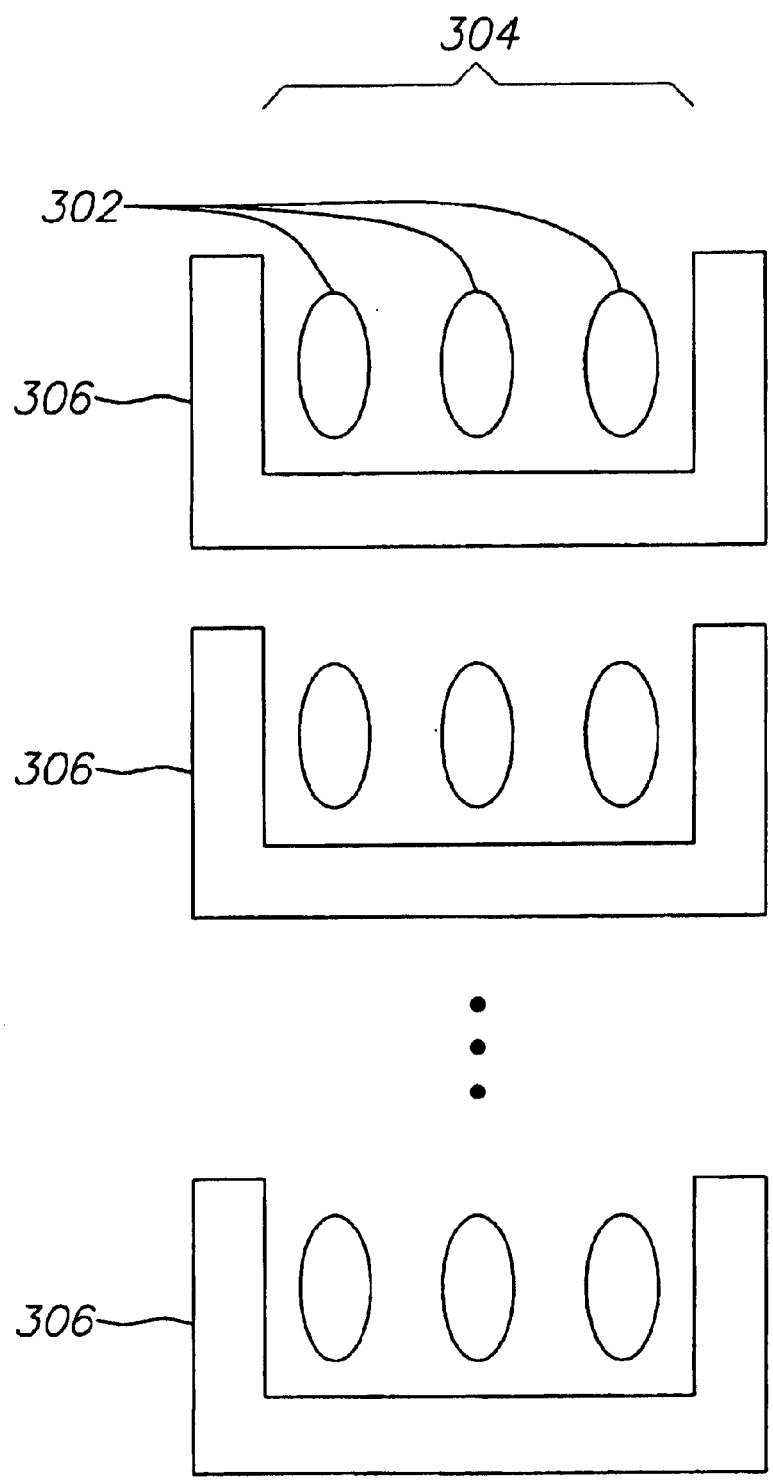
FIG. 3 is a block diagram of one embodiment for multiple sockets/services within a processing chip.

FIG. 3 is a block diagram of another embodiment for a portion of a multi-channel, multi-service system 100. Referring to FIG. 3, service 302 is a self contained set of instructions that has data input/output, control, and a defined interface. Service 302 performs defined processing upon a certain amount and a certain format of data. In addition, service 302 emits a certain amount and a certain format of data. In an alternate embodiment, service 302 may process data in a bidirectional manner. Service stack 304 is a linked set of services 302 that provide a larger processing unit. Service stack 304 is a unique, ordered collection of services 302, such as, for example, echo cancellation services, tone detection services, and voice conferencing services. The services 302 within the service stack 304 are processed in-order.

Socket 306 is a virtual construct that provides a set of services 302 in the form of a service stack 304. The operating system processes services 302 that are encapsulated in socket 306 including connecting the line and/or packet data flow. Processing within socket 306 is data driven. That is, services 302 are invoked by sockets 306 only after the required data has arrived at socket 306. In one embodiment, applications may build protocol stacks by installing a service stack 304 into a socket 306. Services 302, service stacks 304, and sockets 306 are allocated and de-allocated as required by system 100.

Figure 4A:
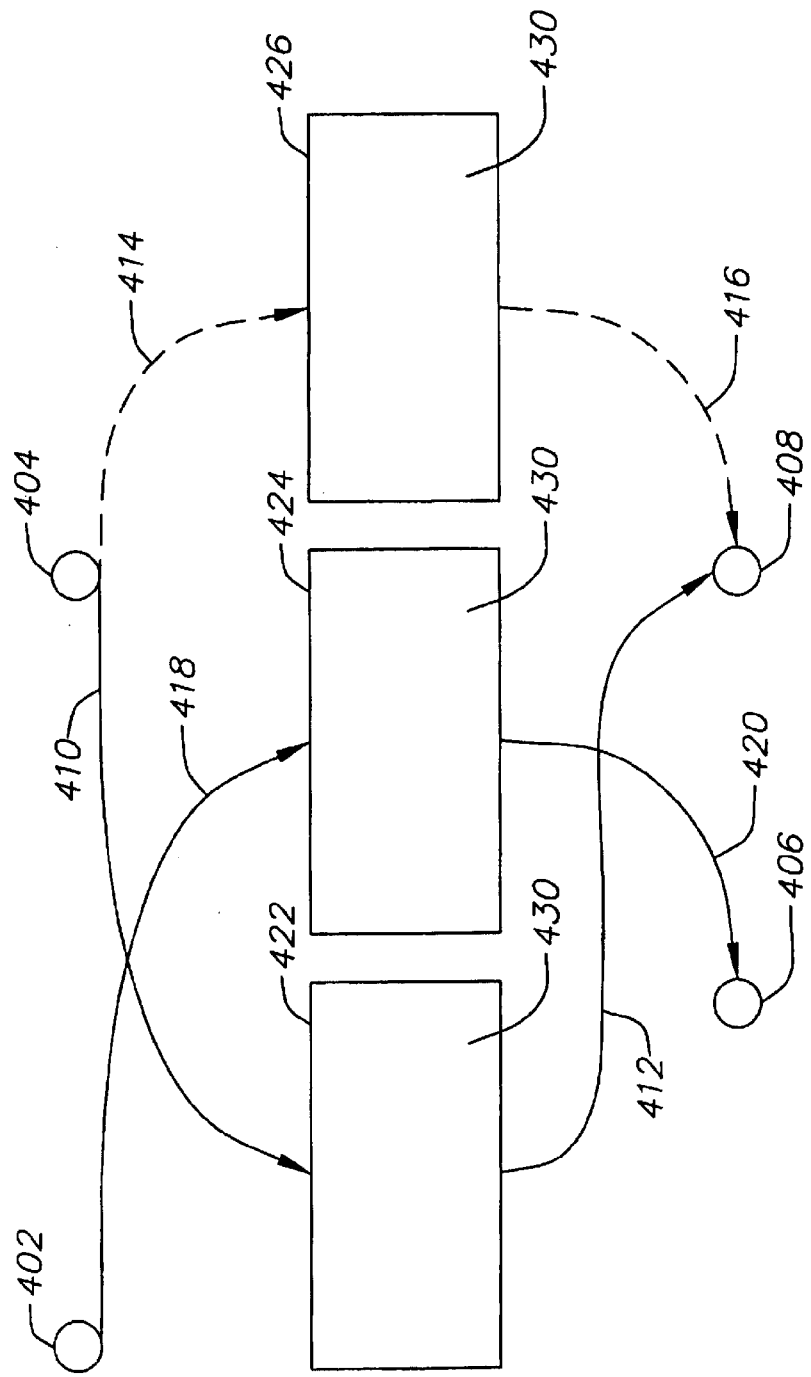
FIG. 4a is an exemplary diagram of channel sockets within the system of FIG. 1.

FIG. 4a is an exemplary diagram of channel sockets (CSs) 430 (422, 424, 426) within system 100. CSs 430 are specialized sockets 306 that direct the flow of information through the system 100 between two or more devices or end points 402, 404, 406, 408. End points may be, for example, physical devices. CS 430 is a socket 306 that accepts a service stack 304 and processes channel data. CS 430 connects any line side slot or bus channel on one end of CS 430 to any other line side slot or bus channel on the opposite end of CS 430. CS 430 is defined by external, physical interface points and provides the ability to process the service stack 304. Information may flow from a physical end point 402 via connection 418 to CS 424. The information is processed by services 302 within CS 424 and is transferred via connection 420 to end point 406. The operating system may dynamically change the flow of information through different CSs 430 depending upon the needs of the end points 402–408. For example, data may be initially set to flow from end point 404 via connection 410 through CS 422 and via connection 412 to end point 408. However, if service stack 304 within CS 422 is incompatible with the data, CS 422 notifies the operating system to break the flow and redirect the information. The operating system then redirects the flow to an existing CS 430 with the proper service stack 304 or creates a new CS 430. Referring to FIG. 4a, the operating system may redirect the flow from end point 404 to end point 408 through connection 414, CS 426, and connection 416. In addition, the operating system may replace the service stack in CS 422 with another stack compatible with the data.

A CS 430 is defined by the external, physical interface end points 402, 404, 406, and 408 and the data flowing through the CS 430. Each end point 402–408 may be different physical devices or the same physical interface or device. CS 422 services may perform a conversion of data. The CS 430 mechanism allows a service stack 304 to be built into the information flow in which services 302 may direct or process the data as it flows through the system. For example, if a first service outputs a 40 byte data frame and a second service uses an 80 byte frame, in one embodiment, the second service waits until the first service outputs enough data in order for the second service to process the data. In an alternate embodiment, the first service delays sending data to the second service until it accumulates enough data. Services 302 are independent modules and are standalone plug-ins. Thus, in one embodiment, services 302 may be dynamically downloaded into shared SRAM 206 in real-time to build CSs 430 as required by the data.

Applications may be written without regard for particular input/output channels or physical interfaces. The operating system is in charge of dynamically allocating and deallocating sockets and connecting input/output components. Thus, the CS 430 mechanism provides single channel programming with multiple channel execution. In addition, an application may be written to provide flow of information between end points 402–408 independent of the type of the operating system and independent of the type of data being processed. CS 430 functions are independent of both the operating system and the hardware configuration. The mechanism also relieves applications of the management of channels and places the management into the operating system, thus producing channel independent applications. In addition, the CS 430 mechanism allows the applications and services 302 to be platform independent.

Figure 4B:
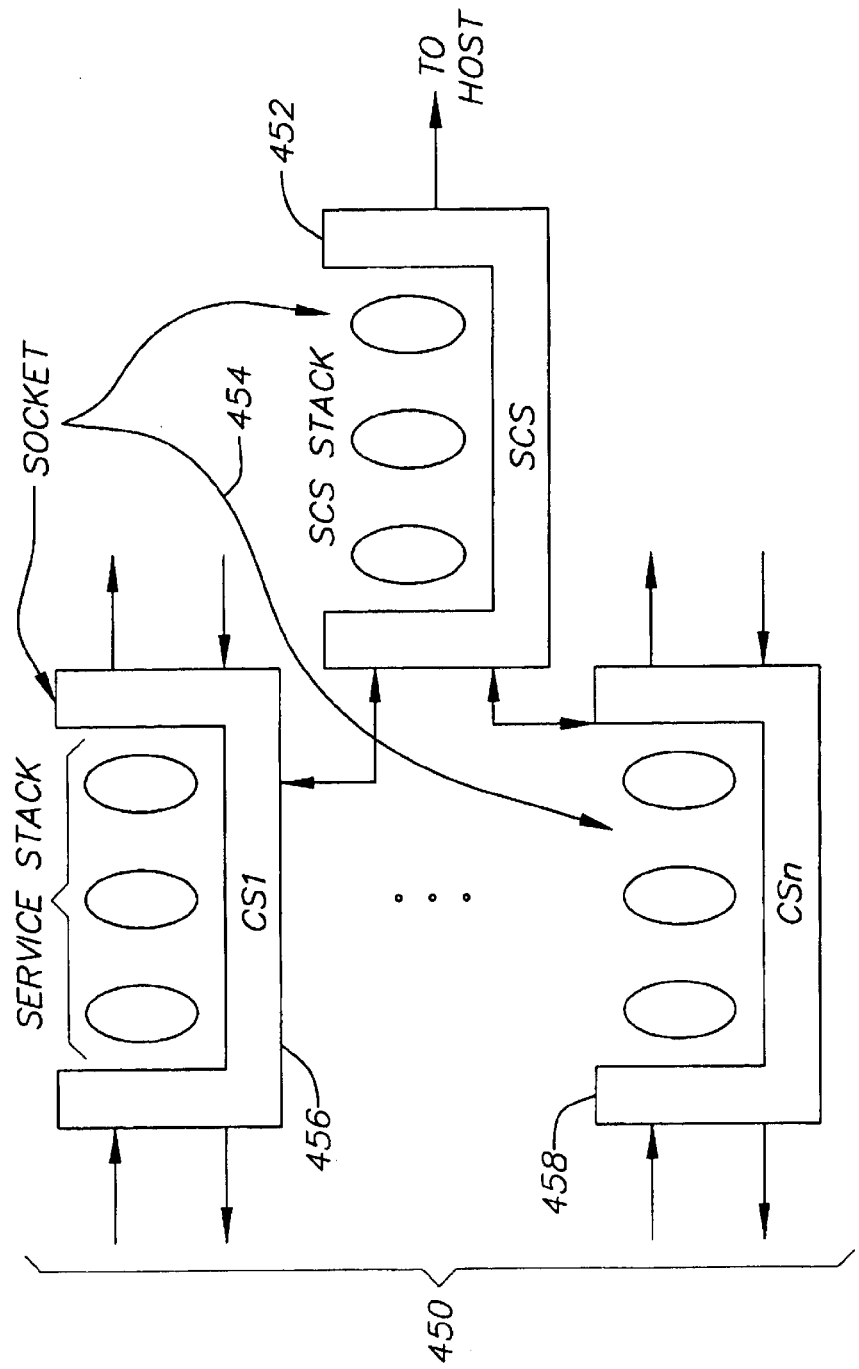
FIG. 4b is a block diagram of one embodiment for a service control socket (SCS) configuration.

FIG. 4b is a block diagram of another embodiment for a portion of a multi-channel, multi-service system 100. Referring to FIG. 4b, system 100 includes SCS 452 which is connected to a host and to a plurality of CSs 450. Service control socket (SCS) 452 is a socket 306 containing the control portion of the services 302 for a service stack 304. Each unique service stack 454 has its own SCS 452. Each SCS 452 controls multiple instances of the same CS 450. Each service 302 within SCS 502 is the control portion for the respective service 302 within CS 510. Services 302 in a CS 450 service stack may receive control messages from that stack's SCS 452. Each service 302 has a data domain and a control domain. The data domain is maintained within socket 306 and the control domain is maintained within SCS 452.

In one embodiment (not shown), a specialized socket, a platform control socket (PCS) runs on the main processor when the system boots. It is the only socket 306 that has knowledge of system wide resources. The PCS manages all resources, including allocating the SCSs to clusters 202, allocating TDM time slots, and allocating bus channels. Applications may not allocate or deallocate any services within the PCS. Specifically, the PCS boots clusters 202 and chips 108, loads and unloads services 302, creates and destroys SCSs, sends a heartbeat to the host 102, and detects if a cluster 202 is inoperative.

In one embodiment, the CS 430 mechanism is used in debugging of applications and services. Since services may be loaded dynamically, the user may choose not to have the debugger in the system if there is no need for debugging operations.

FIG. 5a is a block diagram of one embodiment for an interactive debugging system. Referring to FIG. 5a, debugging system 500 includes debug core 520, graphical user interface (GUI) 510, and abstract machine interface (AMI) 530. Debug core 520 is coupled to GUI 510 via a text-based bi-directional interface 505. GUI 510 provides an application developer with a simple and convenient way of debugging an application or a service. The tools provided by GUI 510 may include, for example, top-level menus, context menus, windows, dialog boxes, and setting of user preferences. Text-based interface 505 provides two-way communication between debug core 520 and GUI 510. In one embodiment, GUI 510 may receive a command from the application developer and send it to debug core 520 using text-based interface 505. Debug core 520, in turn, may send data to GUI 510 using text-based interface 505. GUI 510 may then display this data to the application developer in various ways. For example, debug core 520 may pass information about currently running sockets and services to GUI 510. GUI may then display this information, allow the application developer to select a socket or service for debugging, and transfer data identifying the selected socket or service back to debug core 520.

Debug core 520 is coupled to AMI 530 via text-based bi-directional interface 525. AMI 530 directly communicates with chip 550 or simulator 540. Chip 550 represents processing chips 108–114. Simulator 540 may be used to perform diagnostics of an application or a service in a simulated environment. Simulator 540 allows loading and running an application as if it were running on the chip itself.

All the features and capabilities inherent in chip 550 are available through simulator 540.

In one embodiment, AMI 530 provides an abstract view of multi-channel, multi-service system 100 at the hardware and operating system level. AMI 530 may work with a single target chip or simulator at a time and may view the target chip or simulator as a single entity. AMI 530 allows debug core 520 to provide an isolated debugging environment for each socket or service. In one embodiment, debug core 520 uses AMI 530 to provide an application developer with the ability to control all possible debugging and diagnostic activity on a target socket or service.

Text-based interface 525 enables a two-way communication between debug core 520 and AMI 530. The use of text-based interface 525 simplifies the development process by allowing the design of debug core 520 and AMI 530 as independent modules. In addition, text-based interface 525 allows running debug core 520 and AMI 530 as stand-alone applications. Text-based interface 525 may also improve the quality assurance (QA) process by providing a QA user with the ability to enter the command and get the response back in an automated environment.

In one embodiment, debugging system 500 may operate in various modes. For example, a simulator direct mode (Simulator Direct) allows debug core 520 to communicate with simulator 540 using AMI 530. This mode may provide significant visibility into the BFUs 210 and the state of the system 108, but may not be aware of sockets and other high-level operating system constructs. Simulator Direct provides full control over the simulator. Hence, debug core 520 may obtain all performance analysis results that are supported by the simulator. In one embodiment, AMI 530 may analyze the run-time state of system 108 to determine information about sockets and services directly from the data structures of the operating system.

Debugging system 500 may also operate in an in-circuit emulator mode (ICE). ICE allows debug core 520 to communicate with chip 550 through AMI 530 using the Joint Test Access Group (JTAG) interface of chip 550. ICE supports debugging of the operating system by controlling the cluster processors 208. ICE does not provide access to BFUs 210 and is not capable of controlling or accessing sockets, although one skilled in the art will realize that such functionality can be added easily.

Another exemplary mode is an application debug mode (Application Debug). Application Debug may work with either simulator 540 or chip 550. Application Debug relies on the assistance of the operating system to provide access to system resources (e.g., BFUs 210 and cluster processors 208). Application Debug is capable of controlling and accessing sockets and allows debug core 520 to maintain information about running sockets and services. In one embodiment, this information includes the current state of sockets and/or services which may be identified as, for example, running, stopped, or not started. Debug core 520 may communicate the information to GUI 510. GUI 510 may then present this information to the application developer for selecting a target construct on which to perform debugging operations. It will be recognized by one skilled in the art that the modes described above are merely exemplary and that a wide variety of modes other than those discussed above may be used by debugging system 500 without loss of generality.

Figure 5C:
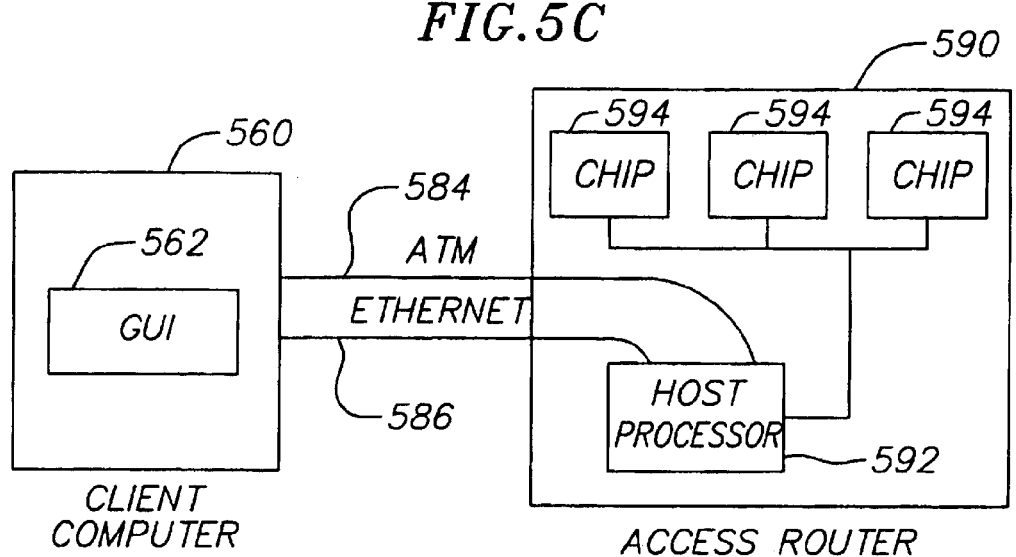

FIGS. 5b and 5c are block diagrams of two alternate embodiments for an interactive debugging system operating over a network. Referring to FIG. 5b, client computer system 560 includes a debugger which communicates with server computer system 570 over a network connection 564. Client 560 contains a debug core and GUI 562. Network connection 564 may include, for example, a local area network and a wide area network. Server 570 includes server application 572 which enables communication between chip 574 residing on server 570 and the debugger residing on client 560. In one embodiment, the debugger may operate in ICE debugging mode. In this embodiment, server application 572 communicates commands from the debugger to chip 574 and then communicates the resulting data from chip 574 to client 560.

Alternatively, the debugger may operate in Application Debug mode. In Application Debug mode, a debugging request from client 560 is sent over network 564 to server 570. Server application 572 communicates the request directly to chip 574. The operating system on chip 574 interprets the request into commands (e.g., set breakpoints or watchpoints, stop the execution, read memory, get status, or display a variable), performs these commands, and generates the appropriate response. The response is then transferred back to client 560 over network connection 564 using server application 572. Network connection 564 may be packet-based (e.g. TCP/IP), cell-based (e.g. ATM) or serial based (e.g. SpiceBus or Utopia). In one embodiment, in a multi-channel, multi-service environment, the operating system on chip 574 may transfer information about running services to client 560 over network connection 564 and allow the debugger on client 560 to operate on an individual service or on a set of services.

Referring to FIG. 5c, another embodiment for a debugging system operating over a network is illustrated. In this embodiment, the debugger on client computer 560 described above in conjunction with FIG. 5b communicates with access router 590 over a network connection. The network connection may include, for example, a local area network such as Ethernet 586 and a wide area network such as ATM 584. The debugger on client 560 may operate in ICE debugging mode or Application Debug mode as described above in conjunction with FIG. 5b.

Router 590 includes host processor 592 which controls operations on router 590 and enables communication between the debugger on client 560 and one or more chips 594 on router 590. Host processor 592 may provide more than one network connections (e.g., Ethernet 586 and ATM 584) between client 560 and router 590 at the same time.

Figure 6:
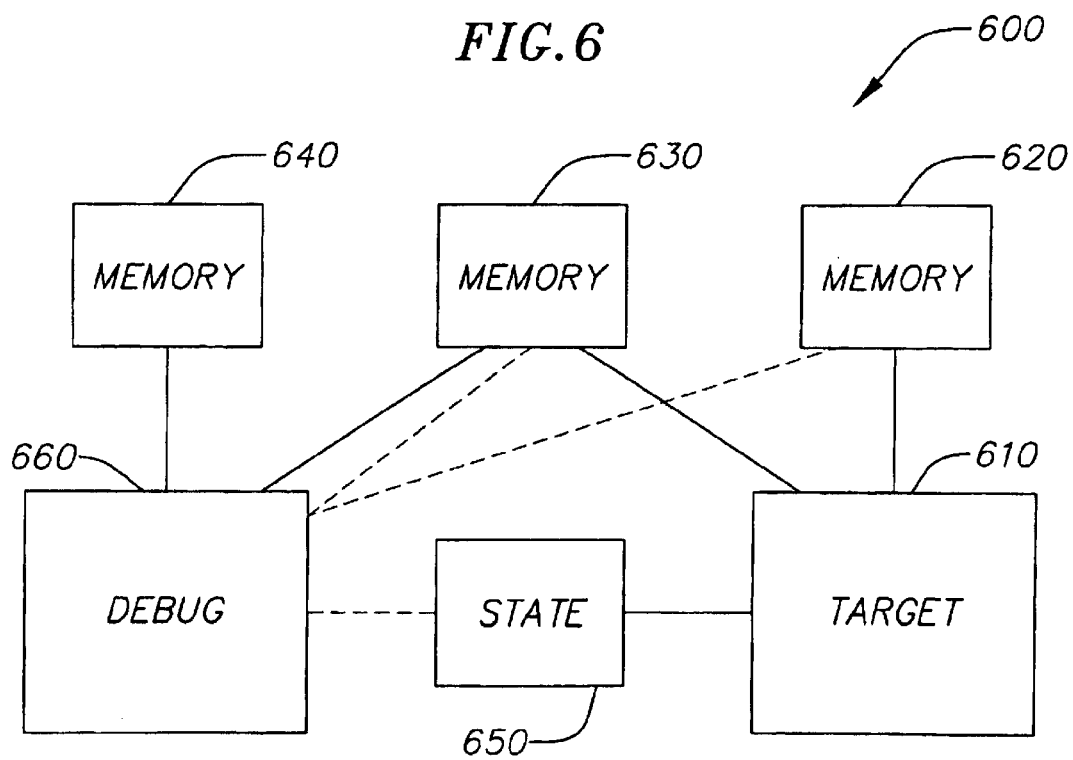
FIG. 6 is a block diagram of one embodiment for a debugging process.

FIG. 6 is a block diagram of one embodiment for a debugging process. Referring to FIG. 6, processing environment 600 may have a number of processing elements (or constructs) running. In one embodiment, construct 610 may run a real time application and construct 660 may run a control task or an operating system task. Construct 610 has independent local memory 620, and construct 660 has independent local memory 640. In one embodiment, constructs 610 and 660 may have shared memory 630, in which separate portions of memory 630 may be assigned to constructs 610 and 660 respectively. Within processing environment 600, each construct has a state. Such state may include the current value of program counters, registers, or performance counters. State 650 illustrates the state of construct 610. In one embodiment, construct 660 may act as a debug agent and may have the capability of accessing data related to the operation of target construct 610. Debug construct 660 may communicate with host 102, or host 560 over a network, and perform the commands received from host 102 or 560.

In one embodiment, debug construct 660 may access and monitor the data related to the operation of target construct 610 without affecting the real time environment of target construct 610. For example, debug construct 660 may be able to look at ("snoop" on) local memory 620, state 650, and the portion of shared memory 630 which is assigned to target construct 610. In one embodiment, debug construct 660 is configured to monitor the above data on the regular basis, e.g. read local memory 620 every 10 milliseconds and retrieve certain data in real time. Alternatively, a minor modification may be made to the application running by target construct 610 to notify (e.g. send a control signal) debug construct 660 when target construct 610 completes a certain task. This notification allows debug construct 660 to avoid reading the data while this data is being modified by target construct 610.

In one embodiment, the data read by debug construct 660 may be transferred to host 102 or 160. Host 102 or 160 may then present data to application developers in real time and may allow them to request a certain level of detail and a particular type of data to be retrieved. Thus, an application developer can visualize the operation of target construct 610 from outside of the construct 610 without interfering with the real time environment of target construct 610. In a multi-channel, multi-service environment, the application developer can monitor the operation of multiple services at the same time.

In another embodiment, the debugging process may directly intercede with the real time environment of construct 610. Debug construct 660 may, for example, modify state 650 to set a breakpoint register or a watchpoint register, request a notification when target construct 610 hits a breakpoint, and stop the operation of target construct 610. Subsequently, debug construct 660 may restart the operation of target construct 610 upon receiving a command from host 102 or 560.

Figure 7:
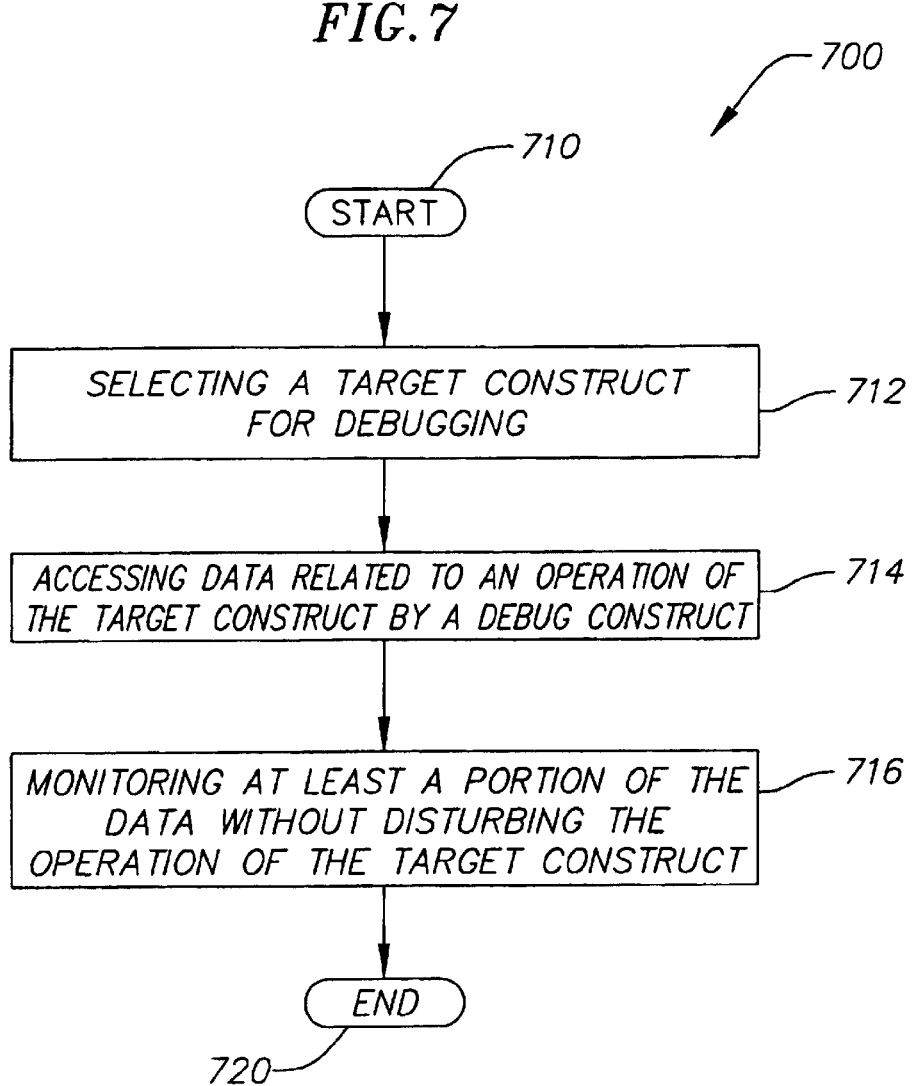
FIG. 7 is a flow diagram of one embodiment for an interactive debugging system.

FIG. 7 is a flow diagram of one embodiment for an interactive debugging system. Initially at processing block 712, a target construct is selected for debugging. In one embodiment, the target construct is a service operating in the processing environment 600 in real time. In alternate embodiments, the target construct may be a set of services, a service stack, a socket, or a set of sockets. At processing block 714, data related to an operation of the target construct is accessed by a debug construct in real time. The debug construct may be a service, a set of services, a service stack, or a socket. In one embodiment, the debug construct may be dynamically allocated on the chip by the operating system similarly to other services and sockets described above. When the debugging operation is completed, the operating system may deallocate the debug construct. Alternatively, debugging can be performed on the simulator. The simulator has all the features and capabilities inherent in the chip. An application developer may load and run an application on the simulator as if the application were running on the chip. In addition, the simulator includes a profiler which provides detailed statistics about running applications.

In yet another embodiment, data may be collected during the real-time operation of the chip. Subsequently, a service, a set of services, a socket, or a set of sockets may be initialized in a simulated environment using the collected data to reproduce and thoroughly debug a problem that occurred in the real-time system.

At processing block 716, the data related to the operation of the target construct or certain portion of this data is monitored by the debug construct. That is, the debug construct snoops on a local memory of the target construct, a section of a shared memory which is assigned to the target construct, or the state of the target construct. The debug construct monitors the above data without disturbing the operation of the target construct.

In one embodiment, the operating system can decide which data is to be snooped on. In addition, the operating system may retrieve (e.g. command the debug construct to retrieve) this data in real time and send it to a host application to provide interactive debugging. In one embodiment, the host system may run a debugger which communicates with the operating system running the debug construct. The host system may present the retrieved data to application developers, receive their input and communicate it back to the debug construct. In one embodiment, the host system includes a GUI which simplifies the use of the debugging system by application developers. For example, the GUI provides the application developers with easy-to-use tools for selecting a chip for debugging, creating new sockets and service stacks on the chip, setting up input and output files for each created socket, and monitoring the operation of any socket or service stack on the chip. In one embodiment, the debug construct and the host system communicate remotely through a communications infrastructure.

In one embodiment, the operating system may measure the bandwidth required to transfer the retrieved data. The operating system may then make a decision on the completeness of the data to be sent based on the available bandwidth. In one embodiment, the data may be sent over a network. Various network interfaces may be used including, for example, a packet-based network interface, a cell-based network interface, or a serial interface. In one embodiment, more than one host system communicate with the operating system on the chip. In this embodiment, host processors may interface an external network protocol (e.g. TCP/IP) to an internal protocol (e.g. serial) connecting to the chip.

Figure 8:
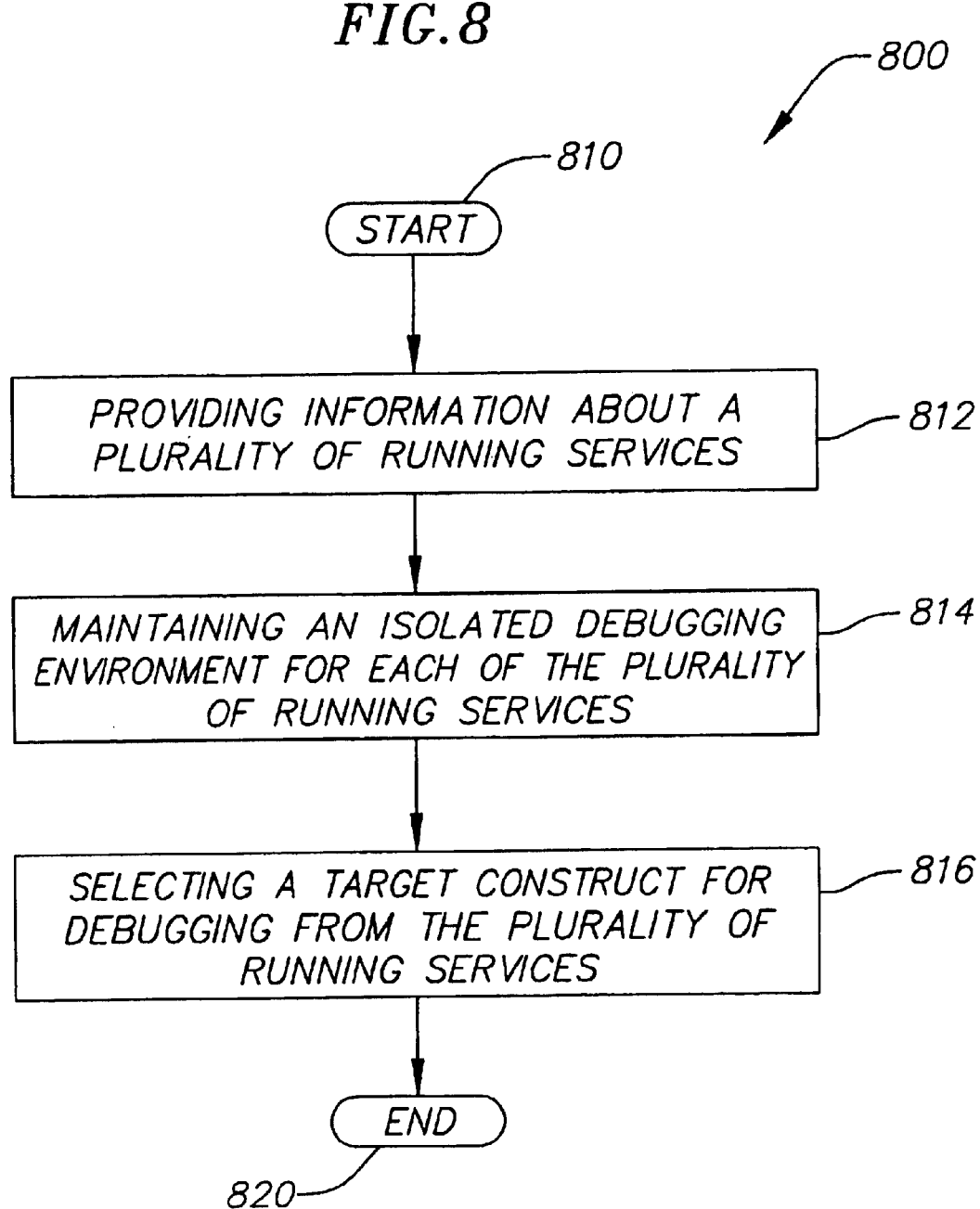
FIG. 8 is a flow diagram of one embodiment for a multi-channel, multi-service debugging system.

FIG. 8 is a flow diagram of one embodiment for a multi-channel, multi-service debugging system. At processing block 812, information about a plurality of services currently running on processor 108, 110, 112 or 114 is provided to the application developer. In one embodiment, the information includes the current state of the plurality of services. The information may also relate to one or more sockets and include the current state of each socket. The current state may be identified as running, stopped, or not started.

In one embodiment, the information is obtained by the operating system which passes it to the host system. In one embodiment, the host system includes a debugger running on the host system. The debugger presents the information about currently running services to the application developer.

At processing block 814, an isolated debugging environment is maintained for a plurality of running service. The isolated debugging environment may provide a separate context (e.g. breakpoints, watchpoints, or variable display) for each running service. In one embodiment, the debugger running on the host system and the operating system running on processor 108, 110, 112 or 114 cooperate to provide the isolated environment for each running service.

At processing block 816, a target construct is selected for debugging from the plurality of running services. In one embodiment, the target construct may be a service, a set of services, a socket, or a set of sockets. Thus, more than one service or socket may be selected by the application developer for performing simultaneous debugging operations.

In one embodiment, the debugger allows the user to dynamically load services into the target construct. The debugger may then cooperate with the operating system to create one or more instantiations of loaded services. In addition, the debugger may allow the user to specify input/output data that supercedes physical interfaces. The substitution may be done for a certain socket or on a whole-interface level in cooperation with the operating system or the debug construct. In one embodiment, all input/output data and socket data is saved on each frame. Subsequently, this data may be read into a simulator for more controlled debug.

In one embodiment, the operating system provides a debugging environment that allows the application developer to debug the operation of the target construct without affecting the real time environment of other running services. The application developer may debug the operation of the target construct by setting breakpoints on each selected service and may arbitrarily switch between the services during the debugging process. In one embodiment, the multi-channel, multi-service debugging may be performed remotely over a network. Remote debugging is described in more detail above.

Figure 9:
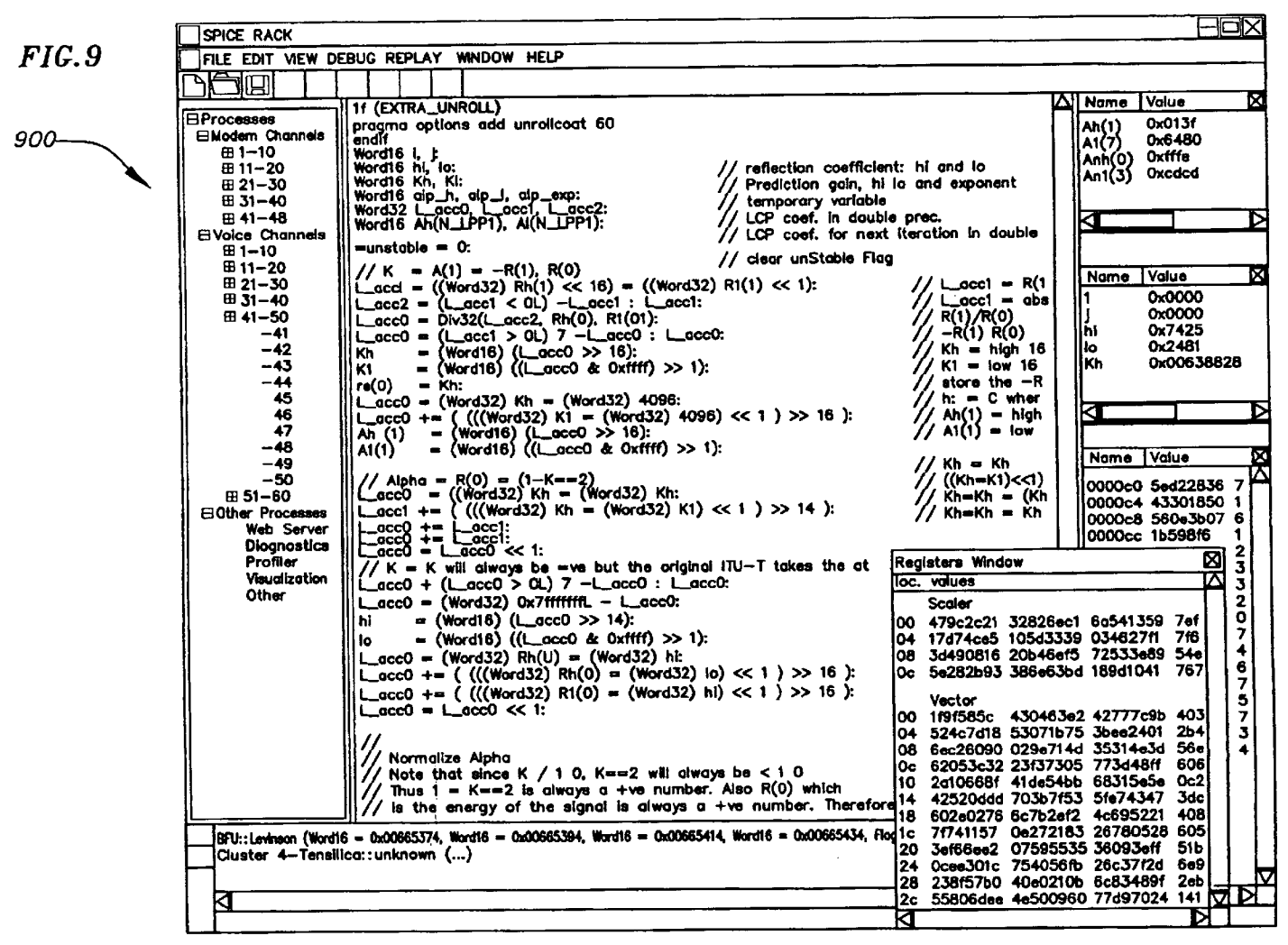

FIG. 9 illustrates an exemplary display window of one embodiment for a multi-channel, multi-service debugging system. Referring to FIG. 9, various views on an application are provided by the debugger. The application developer may see, for example, input and output files, C++ classes, and raw memory addresses. In addition, the debugger provides the application developer with a list of currently running sockets and services. The application developer may select one or more service from the list and view various information related to the operation of the selected service.

A method and system for interactive debugging have been described. The method allows selecting a target construct for debugging. The method may provide for accessing data related to an operation of the target construct by a debug construct in real time. At least a portion of this data may be monitored without disturbing the operation of the target construct to debug the target construct. If needed, the method may retrieve at least the portion of this data and transfer it to a host application. Further, the method may allow the host application to communicate with the debug construct over a network. The method may operate in a multi-channel, multi-service environment. With the present invention, an efficient way of debugging a target application in a multi-channel, multi-service environment is provided, which allows obtaining real-time diagnostics without interfering with the operation of the target application and other running applications and which is capable to perform debugging services remotely.

Several variations in the implementation of the method for interactive debugging have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method for interactive debugging in a multi-channel, multi-service system, the method comprising:

providing a shared memory in which separate portions of the shared memory are assigned to a plurality of executing services and a debug construct, respectively;

selecting a target construct from the plurality of executing services for debugging;

accessing data in the shared memory related to an operation of the target construct by the debug construct in real time;

monitoring at least a portion of the accessed data without disturbing the operation of the target construct; and debugging the target construct using the monitored portion of the accessed data.

2. The method of claim 1 further comprising modifying at least a portion of the data.

3. The method of claim 1 wherein the target construct is one selected from the group consisting of a service, a socket, a service stack, a set of services, and a set of sockets.

4. The method of claim 1 wherein the debug construct comprises at least one service, at least one socket, or a combination of at least one service and at least one socket.

5. The method of claim 1 wherein selecting a target construct further comprises:

providing information about a plurality of services; and selecting the target construct from the plurality of services.

6. The method of claim 5 wherein the information includes a current state of each of the plurality of services.

7. The method of claim 5 further comprising:

providing information about a plurality of sockets; and selecting the target construct from the plurality of sockets.

8. The method of claim 7 wherein the information includes a current state of each of the plurality of services.

9. The method of claim 1 further comprising accessing a memory of the target construct by the debug construct, the accessing corresponding to reading the memory or writing to the memory.

10. The method of claim 1 further comprising accessing state of the target construct by the debug construct, the accessing corresponding to reading the state or modifying the state.

11. The method of claim 1 further comprising dynamically allocating the debug construct.

12. The method of claim 1 further comprising dynamically de-allocating the debug construct once the monitoring is completed.

13. The method of claim 1 further comprising collecting statistics related to the target construct.

14. The method of claim 1 further comprising transmitting the data to at least one host system.

15. The method of claim 14 wherein the data is transmitted based upon a request sent by a host application.

16. The method of claim 14 wherein an operating system determines which data is to be transmitted.

17. The method of claim 14 wherein the debug construct specifies which data is to be transmitted.

18. The method of claim 1 further comprising notifying the debug construct upon a completion of a certain operation by the target construct.

19. The method of claim 14 further comprising:

measuring bandwidth required to transmit the data; and transmitting at least a portion of data based upon available bandwidth.

20. The method of claim 1 wherein debugging is performed in a multi-channel, multi-service environment.

21. The method of claim 15 wherein sending the request and transmitting the response are performed over a network.

22. The method of claim 1 further comprising:

collecting at least a portion of the data;

allocating a copy of the target construct in a simulated environment; and debugging the operation of the target construct using the collected data in the simulated environment.

23. The method of claim 1 further comprising:
generating a request by a host application;
transmitting the request to an operating system;
performing the request by the operating system; and
sending a response to the host application.

24. A method for multi-channel, multi-service debugging, comprising:
providing information about a plurality of running services;
selecting a target construct for debugging from the plurality of running services;
providing a shared memory in which separate portions of the shared memory are assigned to the plurality of running services and a debug construct, respectively; and
dynamically loading one or more of the plurality of running services into the target construct.

25. The method of claim 24 wherein the information about the plurality of running services includes a current state of each service.

26. The method of claim 24 further comprising:
providing information about at least one socket;
maintaining an isolated debugging environment for each of the at least one socket; and
selecting a target construct for debugging from the at least one socket.

27. The method of claim 26 wherein the information about the at least one socket includes a current state of each socket.

28. The method of claim 24 wherein the target construct is one selected from the group consisting of a service, a socket, a service stack, a set of services, and a set of sockets.

29. The method of claim 28 further comprising switching between services and sockets during a debugging process.

30. The method of claim 24 wherein the isolated debugging environment is maintained by an operating system in cooperation with a host application.

31. The method of claim 24 wherein the target construct is selected based upon a request from a host application.

32. The method of claim 24 further comprising:
generating a request by a host application;
transmitting the request to an operating system;
performing the request by the operating system; and
sending a response to the host application.

33. The method of claim 32 wherein transmitting the request and sending a response are performed over a network.

34. The method of claim 24 further comprising:
sending a request by a host application; and
receiving a response by the host application once a requested operation is completed.

35. The method of claim 34 wherein sending a request and receiving a response are performed over a network.

36. The method of claim 24 further comprising:
receiving a request by an operating system;
performing a requested operation; and
transmitting a response once the requested operation is completed.

37. The method of claim 36 wherein receiving a request and transmitting a response are performed over a network.

38. The method of claim 24 further comprising dynamically allocating at least one service into the target construct.

39. The method of claim 38 further comprising instantiating any of at least one service, at least one service stack, and at least one socket.

40. The method of claim 24 further comprising substituting input and output data for at least one socket.

41. The method of claim 40 further comprising:
collecting data for at least one socket;
allocating a copy of the target construct in a simulated environment; and
debugging the operation of the target construct using the collected data.

42. An apparatus for interactive debugging comprising:
a shared memory in which separate portions of the shared memory are assigned to a plurality of executing services and a debug construct, respectively;
means for selecting a target construct from the plurality of executing services for debugging;
means for accessing data in the shared memory related to an operation of the target construct by the debug construct in real time;
means for monitoring at least a portion of the accessed data without disturbing the operation of the target construct; and
debugging the target construct using the monitored portion of the accessed data.

43. An apparatus for multi-channel, multi-service debugging, comprising:
means for providing information about a plurality of running services;
means for selecting a target construct for debugging from the plurality of running services;
a shared memory in which separate portions of the shared memory are assigned to the plurality of running services and a debug construct, respectively; and
means for dynamically loading one or more of the plurality of running services into the target construct.

44. An apparatus for interactive debugging in a multi-channel, multi-service system comprising:
a shared memory in which separate portions of the shared memory are assigned to a plurality of executing services and a debug construct, respectively; and
a target construct selected from the plurality of executing services, wherein the
debug construct is configured to access data in the shared memory related to an operation of the target construct in real time and to monitor at least a portion of the data without disturbing the operation of the target construct.

45. The apparatus of claim 44 wherein the debug construct is further configured to modify at least a portion of the data.

46. The apparatus of claim 44 wherein the target construct is one selected from the group consisting of a service, a socket, a service stack, a set of services, and a set of sockets.

47. The apparatus of claim 44 wherein the debug construct comprises at least one service, at least one socket, or a combination of at least one service and at least one socket.

48. The apparatus of claim 44 further comprising a user interface for providing information about a plurality of services and selecting the target construct from the plurality of services upon a user request.

49. The apparatus of claim of claim 48 wherein the information about a plurality of services includes a current state of each of the plurality of services.

50. The apparatus of claim 48 wherein the user interface further provides information about a plurality of sockets and allows the user to select the target construct from the plurality of sockets.

51. The apparatus of claim of claim 50 wherein the information about a plurality of sockets includes a current state of each of the plurality of sockets.

52. The apparatus of claim 48 wherein the user interface is a text-based interface or graphical user interface.

53. The apparatus of claim 44 further comprising a platform control socket configured to dynamically allocate the debug construct.

54. The apparatus of claim 44 further comprising a platform control socket further configured to dynamically de-allocate the debug construct once the monitoring is completed.

55. The apparatus of claim 44 further comprising a profiler collecting statistics related to the target construct.

56. The apparatus of claim 44 further comprising:
   at least one host processor; and
   a communications infrastructure for transmitting the data to the host processor.

57. The apparatus of claim 56 further comprising an operating system configured to determine which data is to be transmitted, measure bandwidth required to transmit the data, and determine a portion of the data to be transmitted based upon available bandwidth.

58. The apparatus of claim 56 wherein the debug construct is further configured to specify which portion of the data is to be transmitted.

59. The apparatus of claim 56 wherein the data is transmitted based upon the request sent by a host application.

60. The apparatus of claim 44 wherein debugging is performed in a multi-channel, multi-service environment.

61. The apparatus of claim 56 further comprising:
   a host application generating a request;
   a communications infrastructure transmitting the request to the debug construct; and
   the debug construct configured to perform the request and to send a response to the host application.

62. The apparatus of claim 61 wherein the communications infrastructure is a network.

63. The apparatus of claim 56 further comprising a host application sending a request and receiving a response once a requested operation is completed.

64. The apparatus of claim 63 wherein the host application sends a request and receives a response over a network.

65. The apparatus of claim 56 wherein the debug construct is further configured to receive a request, perform a requested operation, and transmit a response once the requested operation is completed.

66. The apparatus of claim 65 wherein the debug construct receives the request and transmits the response over a network.

67. An apparatus for multi-channel, multi-service debugging, comprising:
   a graphical user interface for providing information about a plurality of running services;
   a debug core configured to select a target construct for debugging from the plurality of running services upon a user request;
   a shared memory in which separate portions of the shared memory are assigned to the plurality of running services and the debug core, respectively; and
   means for dynamically loading one or more of the plurality of running services into the target construct.

68. The apparatus of claim 67 wherein the information about the at least one service includes a current state of each service.

69. The apparatus of claim 67 wherein the graphical user interface provides information about at least one socket, the operating system maintains an isolated debugging environment for each of the at least socket, and the debug core is configured to select a target construct for debugging from the at least one socket upon a user request.

70. The apparatus of claim 69 wherein the information about the at least one socket includes a current state of each socket.

71. The apparatus of claim 67 wherein the target construct is one selected from the group consisting of a service, a socket, a service stack, a set of services, and a set of sockets.

72. The apparatus of claim 67 wherein the debug core is further configured to switch between services and sockets during a debugging process upon a user request.

73. The apparatus of claim 67 further comprising a host application configured to send a request to select the target construct.

74. The apparatus of claim 73 further comprising:
   a communications infrastructure transmitting the request to an operating system; and
   the operating system configured to perform the request.

75. The apparatus of claim 74 wherein the communications infrastructure is a network.

76. The apparatus of claim 67 further comprising a host application sending a request for a debugging operation and receiving a response once the operation is completed.

77. The apparatus of claim 67 wherein the operating system receives a request for a debugging operation, performs the operation, and transmits a response once the requested operation is completed.

78. The apparatus of claim 67 further comprising a host application requesting to dynamically allocate at least one service into the target construct and to instantiate at least one service or at least one service stack.

79. The apparatus of claim 67 wherein a host application cooperates with the operating system to substitute input and output data for at least one socket.

80. The apparatus of claim 79 wherein the host application is configured to request to collect data for at least one socket, to allocate a copy of the target construct in a simulated environment, and to debug the operation of the target construct using the collected data in the simulated environment.

81. A computer readable medium comprising instructions, which when executed on a processor, perform a method for interactive debugging in a multi-channel, multi-service system, the method comprising:
   providing a shared memory in which separate portions of the shared memory are assigned to a plurality of executing services and a debug construct, respectively;
   selecting a target construct for debugging from the plurality of executing services;
   accessing data in the shared memory related to an operation of the target construct by the debug construct in real time;
   monitoring at least a portion of the accessed data without disturbing the operation of the target construct; and
   debugging the target construct using the monitored portion of the accessed data.

82. A computer readable medium comprising instructions, which when executed on a processor, perform a method for multi-channel, multi-service debugging, comprising:
   providing information about a plurality of running services;
   selecting a target construct for debugging from the plurality of running services;

providing a shared memory in which separate portions of the shared memory are assigned to the plurality of running services and a debug construct, respectively; and dynamically loading one or more of the plurality of running services into the target construct.

* * * * *

UNITED STATES PATENT AND TRADEMARK OFFICE
CERTIFICATE OF CORRECTION

PATENT NO. : 6,892,324 B1  
DATED : May 10, 2005  
INVENTOR(S) : French et al.

It is certified that error appears in the above-identified patent and that said Letters Patent is hereby corrected as shown below:

<u>Title page,</u>
Item [75], Inventors, delete "Foster City", insert -- Sunnyvale --.

Signed and Sealed this

Second Day of May, 2006

JON W. DUDAS
*Director of the United States Patent and Trademark Office*